United States Patent
Miyake

(10) Patent No.: US 7,298,686 B2
(45) Date of Patent: Nov. 20, 2007

(54) OPTICAL PICKUP AND OPTICAL DISK REPRODUCING DEVICE

(75) Inventor: Takahir Miyake, Soraku-gun (JP)

(73) Assignee: Sharp Kabushiki Kaisha, Osaka (JP)

(*) Notice: Subject to any disclaimer, the term of this patent is extended or adjusted under 35 U.S.C. 154(b) by 638 days.

(21) Appl. No.: 10/737,103

(22) Filed: Dec. 15, 2003

(65) Prior Publication Data

US 2004/0125724 A1 Jul. 1, 2004

(51) Int. Cl.
G11B 7/00 (2006.01)

(52) U.S. Cl. .............................. 369/112.02; 369/112.16

(58) Field of Classification Search .. 369/53.26–53.27, 369/53.37, 112.02, 116
See application file for complete search history.

(56) References Cited

U.S. PATENT DOCUMENTS

| | | | |
|---|---|---|---|
| 6,411,588 B1* | 6/2002 | Kase et al. | 369/112.02 |
| 2002/0018419 A1* | 2/2002 | Watabe | 369/53.26 |
| 2003/0063530 A1* | 4/2003 | Takehara et al. | 369/44.23 |
| 2003/0169667 A1* | 9/2003 | Nishi et al. | 369/112.02 |
| 2003/0179671 A1* | 9/2003 | Nishi et al. | 369/53.2 |

FOREIGN PATENT DOCUMENTS

| | | |
|---|---|---|
| JP | 62-137734 | 6/1987 |
| JP | 04-255925 | 9/1992 |
| JP | 05-089471 | 4/1993 |
| JP | 06-028700 | 2/1994 |
| JP | 06-131683/1994 | 5/1994 |
| JP | 08-255368 | 10/1996 |
| JP | 09-027141 | 1/1997 |
| JP | 2000-195086 | 7/2000 |
| JP | 2001-273674 | 10/2001 |
| JP | 2002-150601/2002 | 5/2002 |
| JP | 2003-115109 | 4/2003 |

* cited by examiner

Primary Examiner—Thang V. Tran
Assistant Examiner—Vanessa Coleman
(74) Attorney, Agent, or Firm—Peter J. Manus; David G. Conlin; Edwards Angell Palmer & Dodge LLP

(57) ABSTRACT

An optical pickup in an optical disk reproducing device is operable to switch operations between a low-power operation mode and a high-power operation mode, and includes a liquid crystal element and a polarization beam splitter, which together attenuate, only in the low-power operation mode, a laser beam emitted by a laser diode onto an optical disk. The liquid crystal element is turned ON only in the low-power operation mode to serve as a polarization rotating element. Working with the polarization beam splitter, the polarization rotating element attenuates a polarized component of the incident light on the optical disk.

12 Claims, 2 Drawing Sheets

OPTICAL PICKUP AND OPTICAL DISK REPRODUCING DEVICE

This Nonprovisional application claims priority under 35 U.S.C. § 119(a) on Patent Application No. 2002/365357 filed in Japan on Dec. 17, 2002, the entire contents of which are hereby incorporated by reference.

FIELD OF THE INVENTION

The present invention relates to optical pickups used for high-density optical disk drives or optical disk evaluation systems, and to optical disk recording and reproducing devices provided with such an optical pickup.

BACKGROUND OF THE INVENTION

Conventionally, optical disk recording and reproducing devices use an optical pickup that incorporates a semiconductor laser (LD: Laser Diode) as a light source. One way to reduce noise in such an optical pickup is to switch the oscillation mode of the laser beam from a single mode to a multi mode mainly by high-frequency modulation (300 MHz to 900 MHz) of the laser beam.

With the recent advancement in high density optical disks (exceeding 10 GB), a blue laser of a short wavelength (400 nm) is beginning to be used for the optical pickup. However, the blue laser produces serious noise in a low power range at or below 2 mW, as shown in FIG. 2, and enough S/N ratio cannot be obtained by the conventional measure of reducing noise by high frequency modulation.

Further, writing information in an optical disk used as a recording medium requires a large laser power for the optical disk. In this case, the semiconductor laser in the optical pickup is used in a high power range, and the noise does not pose a serious problem. On the other hand, in reading information from the optical disk, the semiconductor laser in the optical pickup is used in a low power range, and accordingly the S/N ratio of the output laser beam is low. Further, because the reflected light of the optical disk returns to the semiconductor laser source, the returned light generates noise.

Such a problem is acknowledged in Japanese Publication for Unexamined Patent Application No. 131683/1994 (Tokukaihei 6-131683; published on May 13, 1994), and No. 150601/2002 (Tokukai 2002-150601; published on May 24, 2002), for example. These publications disclose disposing an ND (Neutral Density) filter in an optical path of the laser beam when reproducing information from the optical disk, so as to increase the output laser power in reproducing, and to attenuate the power of the returned light to reduce laser noise.

However, the conventional structure in which the ND filter is disposed in an optical path of the laser beam causes the following problems when it is used in a device operable to record and reproduce information for a single-layer disk and a bi-layer disk, or a device operable to reproduce information in two reproducing modes: a reproducing mode for reproducing information at a normal speed; and a reproducing mode for reproducing information at a double speed.

Reproducing information from a bi-layer disk or reproducing information at a double speed or faster speed requires relatively high reproducing power. Thus, when reproducing information from a bi-layer disk or when reproducing information at a double speed or faster speed ("high power reproducing" hereinafter), the laser noise of the laser diode does not always cause a problem even when the light efficiency of the laser diode is not attenuated using the ND filter.

However, when the ND filter is disposed in an optical path of the laser beam to reproduce information from a single-layer disk or to reproduce information at a normal speed, the output of the laser diode is lost in excess in high power reproducing, with the result that power consumption is increased.

Further, in high power reproducing, when the output of the laser diode is increased further to compensate for the loss through the ND filter, the temperature of the laser diode increases, and the life of the laser diode becomes shorter.

For the optimum control of light efficiency of the laser diode, the ND filter may be removed from the optical path of the laser beam in high power recording. However, this requires a mechanism for inserting and removing the ND filter. In addition, it takes time to insert or remove the filter. That is, it takes time to switch operations requiring the ND filter and not requiring the ND filter.

SUMMARY OF THE INVENTION

The present invention was made in view of the foregoing problems, and it is an object of the present invention to provide an optical disk reproducing device that enables the light efficiency of a laser diode to be quickly switched using means of a simple structure.

In order to achieve this object, the present invention provides an optical pickup installed in an optical disk reproducing device for reproducing information from an optical disk by projecting a laser beam on the optical disk, the optical pickup including a laser source power control section for controlling power of a laser source to switch operation modes between a low-power operation mode (for example, reproducing information from a single-layer disk or reproducing information at a normal speed) and a high-power operation mode (for example, reproducing information from a bi-layer disk or reproducing information at double speed), and an attenuating section (for example, polarization beam splitter and polarization rotating element) for attenuating, only in the low-power operation mode, a laser beam emitted by a laser source (for example, laser diode) onto the optical disk.

With this structure, in the low-power operation mode, the laser beam emitted from the laser source is attenuated by the attenuating section before the laser beam is projected on the optical disk. Thus, high power can be stably obtained for the output of the laser source emitting a laser beam, even in the low-power operation mode in which relatively small power is required for the incident laser beam on the optical disk.

On the other hand, the attenuating section does not serve to attenuate light in the high-power operation mode in which relatively large power is required for the incident laser beam on the optical disk. As a result, the power consumed by the laser source will not be wasted, and the life of the laser source can be extended.

Further, in order to achieve the foregoing object, the present invention provides an optical disk reproducing device for reproducing information from an optical disk by projecting a laser beam on the optical disk, the optical disk reproducing device including an optical pickup operable to reproduce information in a low-power operation mode and a high-power operation mode by switching the two operation modes, the optical pickup including an attenuating section for attenuating, only in the low-power operation mode, a laser beam emitted by a laser source onto the optical disk.

With this structure, as with the optical pickup, the laser beam emitted from the laser source is attenuated by the attenuating section in the low-power operation mode before the laser beam is projected on the optical disk. Thus, high power can be stably obtained for the output of the laser source emitting a laser beam, even in the low-power operation mode in which relatively small power is required for the incident laser beam on the optical disk.

On the other hand, the attenuating section does not serve to attenuate light in the high-power operation mode in which relatively large power is required for the incident laser beam on the optical disk. As a result, the power consumed by the laser source will not be wasted, and the life of the laser source can be extended.

For a fuller understanding of the nature and advantages of the invention, reference should be made to the ensuing detailed description taken in conjunction with the accompanying drawings.

DESCRIPTION OF THE EMBODIMENTS

One embodiment of the present invention is described below with reference to FIG. 1 and FIG. 2. It should be appreciated that the present invention is not limited by the following descriptions in any ways.

In one embodiment, the present invention describes an optical disk reproducing device operable to reproduce information from a single-layer disk and a bi-layer disk.

Figure 1:
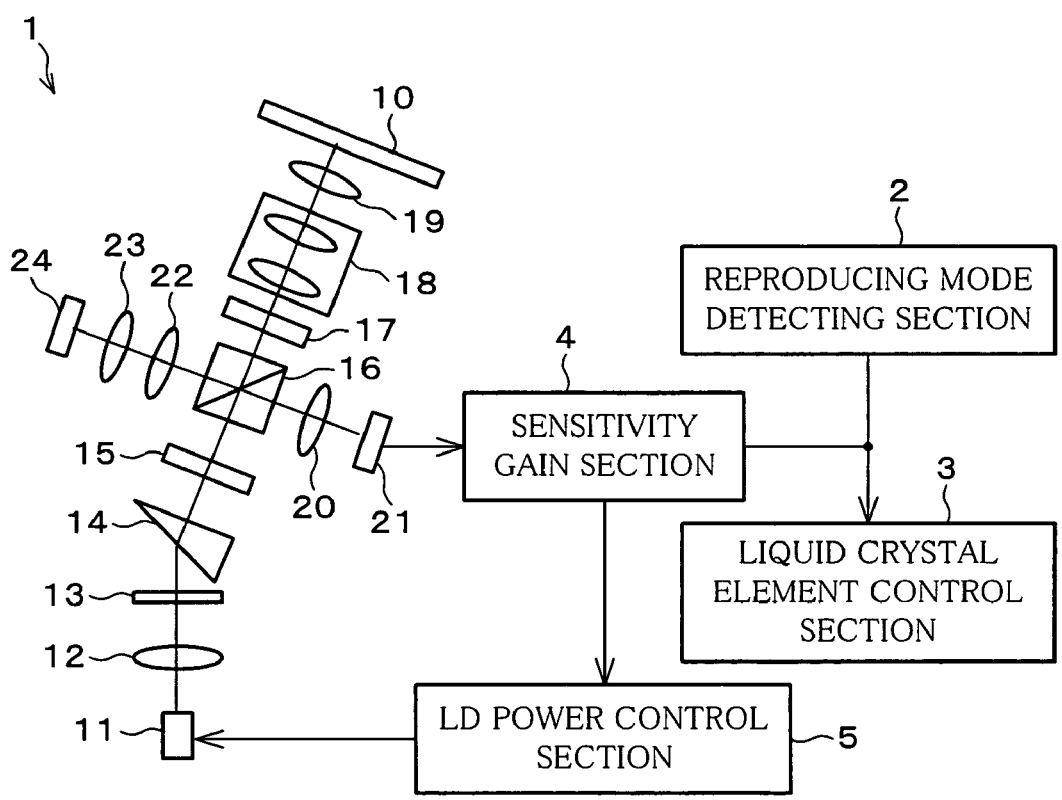
FIG. 1 is a block diagram schematically showing a structure of an optical disk reproducing device in one embodiment of the present invention.

As illustrated in FIG. 1, the optical disk reproducing device of the present embodiment includes an optical pickup 1 for projecting a laser beam on the both types of optical disks, the single-layer disk and the bi-layer disk, to reproduce information.

In the optical pickup 1, a laser diode (LD) 11 that emits a laser beam of a short wavelength is provided as a light source (laser source) for emitting a laser beam on an optical disk 10. In the optical path of the laser beam from the laser diode 11 to the optical disk 10, the optical pickup 1 further includes a collimating lens 12, a liquid crystal element 13, a shaping prism 14, a grating 15, a polarization beam splitter 16, a quarter wavelength plate 17, a beam expander unit 18, and an objective lens 19.

The optical pickup 1 further includes a LD power control section (laser source power control means) 5 for controlling power of the laser source so as to switch operation modes between a low-power operation mode and a high-power operation mode.

Through the collimating lens 12, the laser beam emitted from the laser diode 11 is converted into a parallel ray. The liquid crystal element 13 introduces a phase difference in the laser beam. The shaping prism 14 shapes the light beam. The grating 15 splits the laser beam into three beams for servo control, so that three beam spots are projected onto the optical disk 10.

Through the polarization beam splitter 16, the laser beam emitted from the laser diode 11 is separated into S polarized light and P polarized light, the former being reflected at the boundary in the polarization beam splitter 16, and the latter being transmitted to fall on the optical disk 10.

In the optical pickup 1, the S polarized light reflected by the polarization beam splitter 16 propagates toward a lens 20 and a monitor diode (monitor means) 21. The S polarized laser beam reflected by the polarization beam splitter 16 travels through the lens 20, and part of the light falls on the monitor diode 21, which monitors the level of the laser beam it receives.

On the other hand, the P polarized light that passes through the boundary in the polarization beam splitter 16 is converted into circularly polarized light as it passes through the quarter wavelength plate 17. The light is then focused on a recording face of the optical disk 10 through the beam expander unit 18 and the objective lens 19, and is reflected on the recording face.

The laser beam reflected off the recording face of the optical disk 10 travels back to the polarization beam splitter 16 through the objective lens 19, the beam expander unit 18, and the quarter wavelength plate 17. Through the quarter wavelength plate 17, the laser beam reflected on the optical disk 10 is converted from circularly polarized light into S polarized light. The light, by being S polarized light, undergoes total internal reflection in the polarization beam splitter 16, and enters a photodiode 24 through a cylindrical lens 22 and a spot lens 23. Based on the received light, the photodiode 24 outputs signals for focusing and tracking the beam projected on the optical disk 10. In reproducing information from the optical disk 10, the information recorded in the optical disk 10 is read out from the reflected light of the optical disk 10 incident on the photodiode 24. Operations of the LD power control section 5 will be described later.

The optical disk reproducing device including the optical pickup 1 further includes a reproducing mode detecting section 2, a liquid crystal element control section 3, and a sensitivity gain section (monitor means) 4. Operations of these members will be described later.

In the following, the operation of the optical disk reproducing device of the foregoing structure is described. In the present embodiment, the optical pickup 1 of the optical disk reproducing device is operated in two operation modes: a high-power operation mode and a low-power operation mode.

The high-power operation mode requires a relatively high laser power for the laser beam projected on the optical disk 10. In the optical disk reproducing device for reproducing information from a single-layer disk and a bi-layer disk, the operation mode for reproducing information from a bi-layer disk corresponds to the high-power operation mode.

On the other hand, the low-power operation mode allows for use of a small laser power for the laser beam projected on the optical disk 10. In the optical disk reproducing device for reproducing information from a single-layer disk and a bi-layer disk, the operation mode for reproducing information from a single-layer disk corresponds to the low-power operation mode.

In the high-power operation mode, the liquid crystal element 13 for generating a phase difference is turned OFF (no voltage is applied to the liquid crystal layer of the liquid crystal element 13). Here, a proportion of the output laser power from the objective lens 19 with respect to the output laser power of the laser diode 11 (light efficiency) is 15% for example. Specifically, when the output laser power required for the objective lens 19 is 0.6 mW, the laser diode 11 requires an output of 4 mW.

In the low-power operation mode, the liquid crystal element 13 for generating a phase difference is turned ON (voltage is applied to the liquid crystal layer of the liquid crystal element 13). In this case, a phase difference of $\lambda/2$ is introduced to the laser beam emitted from the laser diode 11 as the beam passes through the liquid crystal element 13. That is, the liquid crystal element 13 rotates the direction of polarization of the linearly P polarized light of the incident laser beam by 45°, so that the light is converted into linearly polarized light with an S polarized component.

As a result, in the low-power operation mode, the light emitted from the laser diode 11 and passes through the polarization beam splitter 16, i.e., the light projected on the optical disk 10, is, for example, 50% weaker than that in the high-power operation mode. It is preferable that the transmittance of the P polarized light that passes through the polarization beam splitter 16 and falls on the objective lens 19 is about 20% to 50% of that generated when the liquid crystal element 13 is OFF (high-power operation mode). The quantity of the light attenuated through the polarization beam splitter 16 is proportional to the quantity of S polarized light reflected into the monitor diode 21, thus increasing the quantity of incident light on the monitor diode 21 for the quantity of the light passing through the polarization beam splitter 16.

Further, in the low-power operation mode, because the liquid crystal element 13 is ON, the light efficiency of the optical pickup 1 is 7.5%, as opposed to 15% in the high-power operation mode. Thus, when the required reproducing power (output laser power from the objective lens) for the optical disk 10 (single-layer disk) is 0.3 mW, the laser diode 11 requires an output of 4 mW.

Figure 2:
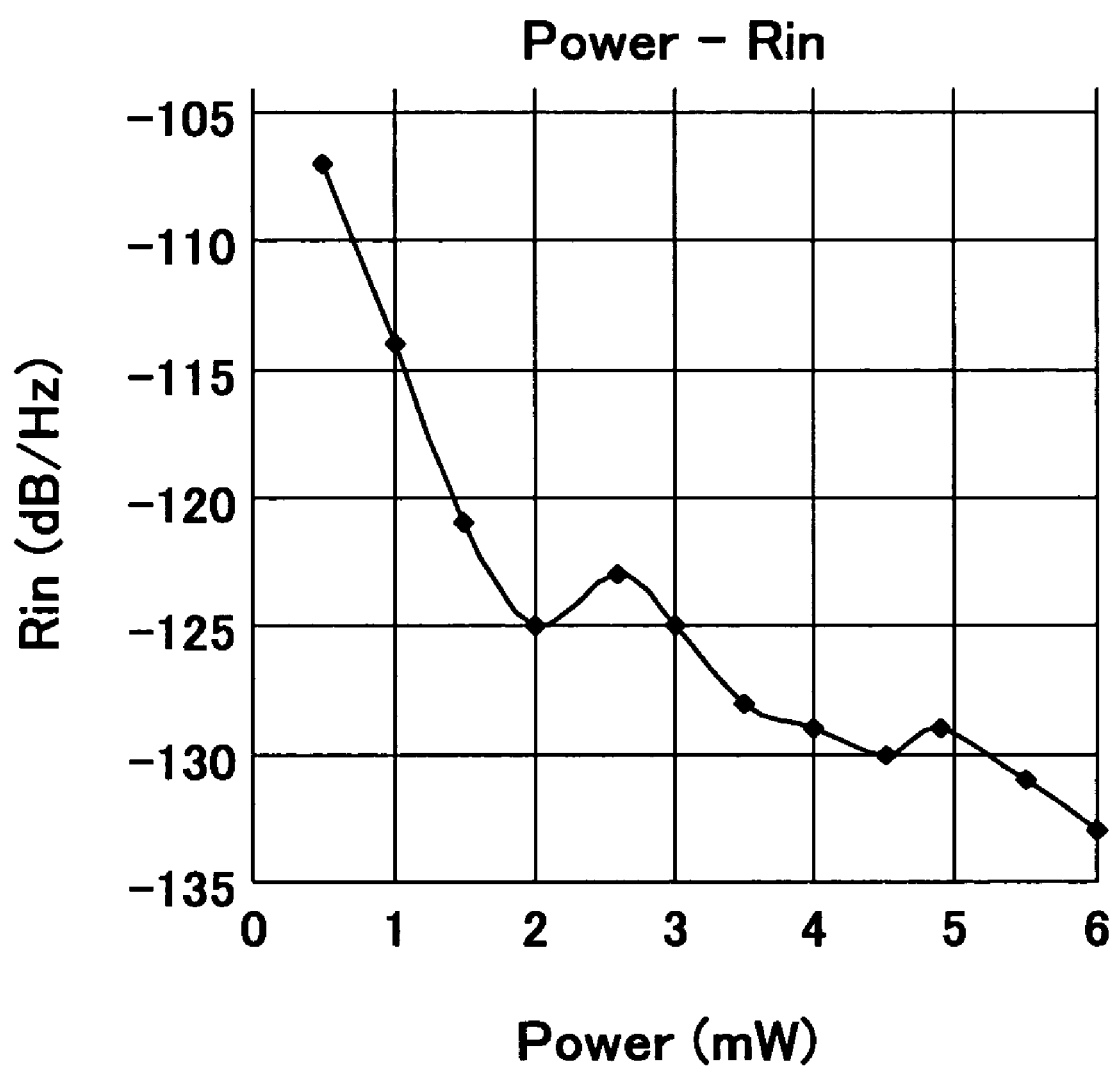
FIG. 2 is a graph representing a correlation between output and noise of a laser diode used as a light source of an optical pickup in the optical disk reproducing device.

FIG. 2 represents a relationship between output power and laser noise of the laser diode 11. In FIG. 2, the vertical axis denotes Rin (relative noise intensity), which is a parameter indicative of an amount of generated noise, and is defined as 10 Log{(ac light power density/Hz)/(dc light power)}.

As set out above, the output of the laser diode 11 is 4 mW in the low-power operation mode, which corresponds to an Rin of −129 dB/Hz in the graph of FIG. 2. In common optical disk reproducing devices, laser noise does not occur when Rin is at or below −125 dB/Hz. The output of the laser diode 11 in the low-power operation mode satisfies this condition and does not cause laser noise (no adverse effect is caused in reproducing).

Thus, even in the low-power operation mode requiring lower reproducing power, the laser beam emitted from the laser diode 11 can have a high output power without causing laser noise. On the other hand, in the high-power operation mode, because the liquid crystal element 13 is OFF, there is no loss in the laser beam emitted from the laser diode 11. As a result, power consumption can be reduced, and life of the laser diode 11 can be extended.

Further, in the optical pickup 1, whether to introduce a phase difference in the laser beam passing through the liquid crystal element 13 can be controlled by ON/OFF of the liquid crystal element 13. Switching between the high-power operation mode and the low-power operation mode is made in this manner.

That is, in the optical disk reproducing device with the optical pickup 1 of the present embodiment, the operation modes are switched only by switching ON/OFF of applied voltage to the liquid crystal layer of the liquid crystal element 13. Since this does not require any mechanism for inserting and removing a filter element for example, the structure of the optical pickup 1 is simplified.

Further, since ON/OFF of the liquid crystal element 13 can be switched within several milliseconds, the time required for switching the operation modes is significantly shorter than that required for switching by mechanically inserting and removing a filter element.

Note that, the liquid crystal element 13 used in the optical pickup 1 rotates the direction of polarization of the linearly P polarized light in the low-power operation mode by generating a $\lambda/2$ phase difference. According to this structure, as described above, the light that falls on the optical disk 10 is attenuated, and the quantity of incident light on the monitor diode 21 is increased for the quantity of the attenuated light. Thus, in the optical disk reproducing device using the optical pickup 1 with the semiconductor element 13, the laser output control for the laser diode 11 (controlling the output laser power from the objective lens), which is carried out based on the quantity of detected light in the monitor diode 21, needs to be different for the high-power operation mode and the low-power operation mode. In the optical disk reproducing device, this is achieved by the LD power control section 5, which switches the laser output control modes of the laser diode 11 between the low-power operation mode and the high-power operation mode.

For example, in the optical disk reproducing device that can switch the low-power operation mode and the high-power operation mode to reproduce information from a single-layer disk and a bi-layer disk, the reproducing mode detecting section 2, when the optical disk 10 is a single-layer disk, supplies a signal indicative of single-layer disk reproducing to the liquid crystal element control section 3 (see FIG. 1).

Based on the supplied signal from the reproducing mode detecting section 2, the liquid crystal element control section 3 turns ON the liquid crystal element 13 to generate a phase difference, so that the low-power operation mode is set for the optical pickup 1. Here, in order to control the power of the output laser from the objective lens, the sensitivity gain section (monitor means) 4 detects a detected signal of the monitor diode 21 as a reference. Based on the result of detection by the sensitivity gain section 4, the LD power control section 5 controls the output of the laser diode 11.

In the low-power operation mode in which the liquid crystal element 13 is turned ON and the quantity of incident light on the monitor diode 21 is increased, the reproducing mode detecting section 2 outputs a gain switching signal to the sensitivity gain section 4 as soon as the liquid crystal element 3 is turned ON, so that the output laser power from the objective lens can be accurately controlled according to the detected level in the low-power operation mode. Further, in this case, because the incident light on the monitor diode 21 used to control the output laser power from the objective lens is relatively greater than the output laser power from the objective lens, the incident light on the monitor diode 21 can be used to accurately control power without the influence of noise.

In the high-power operation mode in which the liquid crystal element 13 is turned OFF and the quantity of incident light on the monitor diode 21 is smaller than that in the low-power operation mode, the reproducing mode detecting section 2 outputs a gain switching signal to the sensitivity gain section 4 as soon as the liquid crystal element 13 is turned OFF, so that the output laser power from the objective lens is accurately controlled according to the detected level in the high-power operation mode.

That is, in the optical disk reproducing device, the quantity of incident light on the monitor diode 21 is reduced in the high-power operation mode, and is increased in the low-power operation mode. Accordingly, the gain of the sensitivity gain section 4 is set to be greater in the high-power operation mode than in the low-power operation mode.

It should be noted that the optical disk reproducing device described in this embodiment is only one example of the present invention, and the present invention is not limited in any ways by this example.

As described herein, the liquid crystal element 13 that rotates the direction of polarization of the linearly P polarized light by generating a λ/2 phase difference corresponds to attenuating means for attenuating the quantity of incident laser beam on the optical disk 10 only in the low-power operation mode. To be more precise, the liquid crystal element 13, together with the polarization beam splitter 16, corresponds to the attenuating means defined in claims, because the incident laser beam on the optical disk 10 is actually attenuated as it passes through the polarization beam splitter 16 in the described embodiment.

Alternatively, the attenuating means may be, for example, an element that generates a predetermined phase difference to convert linearly P polarized light into elliptically polarized light. Further, the element that attenuates light by introducing a phase difference in the laser beam in the low-power operation mode is not just limited to the liquid crystal element but may be a retardation plate. However, the liquid crystal element is more preferable than the retardation plate because the liquid crystal element enables the operation modes to be electrically switched while the retardation plate needs to be mechanically inserted or removed to switch the operation modes.

Further, the attenuating means may be an element with a filtering effect, by either reflecting or absorbing light (reflecting element or absorbing element). In this case, the light returning from the optical disk 10 to the laser diode 11 can also be attenuated, thus more effectively reducing laser noise without increasing the number of components. As with the element for generating a phase difference, this type of element is not limited to the liquid crystal element but the liquid crystal element is preferable because it enables the operation modes to be electrically switched.

Note that, when the attenuating means is a reflecting or absorptive filter, the sensitivity gain section 4 is set to have the same gain for the low-power operation mode and the high-power operation mode, because in this case the quantity of incident light on the monitor diode 21 is the same in the low-power operation mode and the high-power operation mode. That is, the laser output control modes are not switched between the low-power operation mode and the high-power operation mode.

Further, the foregoing described the optical disk reproducing device in which the low-power operation mode is for reproducing information from a single-layer disk, and the high-power operation mode is for reproducing information from a bi-layer disk. However, the present invention is also applicable to an optical disk reproducing device in which the low-power operation mode is for reproducing information at a normal speed, and the high-power operation mode is for reproducing information at a double speed or faster speed.

Further, the optical disk reproducing device according to the present invention is not just limited to devices for reproducing information. For example, the present invention may be a device that records information using a recordable optical disk such as a phase-change optical disk.

When the optical disk reproducing device is operable to carry out recording, it is preferable that recording be carried out at the light efficiency of the high-power operation mode by turning OFF the liquid crystal element 13, because recording requires higher laser power than reproducing. That is, the attenuating means does not attenuate the laser beam in recording.

Accordingly, in this case, a proportion of the output laser power from the objective lens 19 with respect to the output of the laser diode 11 is 15%. In other words, when the output laser power from the objective lens required for recording is 5 mW, the laser diode 11 requires an output of 33 mW.

In the optical pickup of the present invention, the attenuating means may be realized by a combination of the polarization beam splitter disposed in an optical path between the laser source and the optical disk, and the polarization rotating element disposed between the laser source and the polarization beam splitter.

According to this structure, the laser beam in the low-power operation mode is attenuated in the following manner. For example, a P polarized component of the laser beam emitted from the laser source is rotated as it passes through the polarization rotating element, so that the light is converted into linearly polarized light with an S polarized component (P polarized component is reduced). Through the polarization beam splitter, the laser beam is then separated into P polarized light (transmitted light, for example) and S polarized light (reflected light, for example). Here, the P polarized light is the laser beam that falls on the optical disk, thereby attenuating the laser beam projected on the disk. In this case, the S polarized component is increased for the quantity of the attenuated laser beam falling on the disk, i.e., the P polarized component. Thus, by using the S polarized light as monitor input to control the output laser power from the objective lens, the output laser beam from the objective lens can be controlled with the relatively large incident light on the monitor diode, thereby accurately controlling power without the influence of noise.

Further, the optical pickup of the present invention may be adapted so that the polarization rotating element is a liquid crystal element with a liquid crystal layer that introduces a phase difference in the laser beam in response to applied electric field in the low-power operation mode.

With this structure, the low-power operation mode and the high-power operation mode can be switched simply by ON/OFF of applied voltage to the liquid crystal layer. In this way, switching between the two operations can be made considerably faster than that required in a structure wherein the element (attenuating means) is mechanically inserted and removed, thereby reducing the startup time for reproducing. Note that, means for applying an electric field to the liquid crystal layer may be provided external to the optical pickup.

In the optical pickup of the present invention, it is preferable that the transmittance of the P polarized component of the light beam passing through the polarization beam splitter in the low-power operation mode is 20% to 50% of that in the high-power operation mode.

With this structure, a proportion of light efficiency of the laser source can be optimized for the low-power operation mode with respect to the high-power operation mode.

Further, in the optical pickup of the present invention, the attenuating means may be a reflecting element for reflecting part of the incident light beam from the laser source, or an absorbing element for absorbing part of the incident light beam from the laser source.

With this structure, the laser beam in the low-power operation mode is attenuated by the reflecting element or absorbing element reflecting or absorbing part of the laser beam emitted from the laser source. In this case, the light returning from the disk to the light source is attenuated simultaneously, thus reducing laser noise more effectively.

The optical pickup of the present invention may be adapted so that the reflecting element or absorbing element is a liquid crystal element that serves as the reflecting element or absorbing element in response to applied electric field in the low-power operation mode.

With this structure, switching between the low-power operation mode and the high-power operation mode can be carried out simply by ON/OFF of applied voltage to the liquid crystal layer. In this way, switching between the two operations can be made considerably faster than that required in a structure wherein the element (attenuating means) is mechanically inserted and removed, thereby reducing the startup time for reproducing. Note that, means for applying an electric field to the liquid crystal layer may be provided external to the optical pickup.

Further, the optical pickup of the present invention may be adapted so that the attenuating means includes at least a liquid crystal element with a liquid crystal layer, and the liquid crystal element attenuates the incident laser beam on the optical disk in response to applied electric field to the liquid crystal layer in the low-power operation mode.

With this structure, switching between the low-power operation mode and the high-power operation mode can be carried out simply by ON/OFF of applied voltage to the liquid crystal layer. In this way, switching between the two operations can be made considerably faster than that required in a structure wherein the element (attenuating means) is mechanically inserted and removed, thereby reducing the time required for starting reproducing. Note that, means for applying an electric field to the liquid crystal layer may be provided external to the optical pickup.

Further, the optical pickup of the present invention may be operable to reproduce information from a single-layer disk and a bi-layer disk, wherein the optical pickup is operated in the low-power operation mode when reproducing information from the single-layer disk, and in the high-power operation mode when reproducing information from the bi-layer disk.

With this structure, reproducing from the single-layer disk can be carried out without causing serious laser noise, and a desirable reproduction signal can always be obtained. In addition, the laser output does not become excessively high even when reproducing information from the bi-layer disk. As a result, power consumption can be reduced, a rise in temperature of the laser source can be suppressed, and life of the laser source can be extended.

Further, the optical pickup of the present invention may be operable to reproduce information from a disk at a normal speed and a double or faster speed, wherein the optical pickup is operated in the low-power operation mode when reproducing information at a normal speed, and in the high-power reproducing mode when reproducing information at a double or faster speed.

With this structure, normal reproduction can be carried out without causing serious laser noise, and a desirable reproduction signal can always be obtained. In addition, the laser output does not become excessively high even when reproducing information at a double or faster speed. As a result, power consumption can be reduced, a rise in temperature of the laser source can be suppressed, and life of the laser source can be extended.

Further, the optical disk reproducing device according to the present invention may be operable to record information in an optical disk, wherein the optical pickup is operated in the high-power operation mode when recording information.

With this structure, the laser output does not become excessively high in recording. As a result, power consumption can be reduced, a rise in temperature of the laser source can be suppressed, and life of the laser source can be extended.

Further, in the optical disk reproducing device according to the present invention, the attenuating means may include a polarization beam splitter disposed between the laser source and the optical disk, and a liquid crystal element with a liquid crystal layer for generating a phase difference in the laser beam in response to applied electric field in the low-power operation mode.

According to this structure, the laser beam in the low-power operation mode is attenuated in the following manner. For example, a P polarized component of the laser beam emitted from the laser source is rotated as it passes through the polarization rotating element, so that the light is converted into linearly polarized light with an S polarized component (P polarized component is reduced). Through the polarization beam splitter, the laser beam is then separated into P polarized light (transmitted light, for example) and S polarized light (reflected light, for example). Here, the P polarized light is the laser beam that falls on the optical disk, thereby attenuating the laser beam projected on the disk.

In this case, the S polarized component is increased for the quantity of the attenuated laser beam falling on the disk, i.e., the P polarized component. Thus, when the optical disk reproducing device is to use the S polarized light as monitor input to control the output laser power from the objective lens, the laser output control (control of the output laser power from the objective lens) of the laser source based on the monitored light quantity (quantity of S polarized light) needs to be carried out differently for the high-power operation mode and the low-power operation mode.

To this end, the optical disk reproducing device may be adapted to include monitor means (for example, monitor diode, sensitivity gain section) for detecting a quantity of the laser beam, and a laser source power control means (for example, LD power control section) for controlling output of the laser source based on the result of detection by the monitor means, wherein the laser source control means switches control operations between the low-power operation mode and the high-power operation mode.

With this structure, the output laser power from the objective lens can be accurately controlled according to the power levels of the respective operation modes.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. An optical pickup installed in an optical disk reproducing device for reproducing information from an optical disk by projecting a laser beam on the optical disk,
said optical disk reproducing device comprising:
laser source power control means for controlling power of a laser source to switch operation modes between a low-power operation mode in which a single-layer disk is reproduced or a disk is reproduced at a normal speed and a high-power operation mode in which a bi-layer disk is reproduced or a disk is reproduced at a double speed; and attenuating means for attenuating, only in the low-power operation mode, a laser beam emitted by a laser source onto the optical disk, wherein the attenuating means includes a polarization beam splitter disposed in an optical path between the laser source and the optical disk, and a polarization rotating element disposed between the laser source and the polarization beam splitter, and a transmittance of a P polarized component of the laser beam passing through the polarization beam splitter in the low-power operation mode is 20% to 50% of that in the high-power operation mode.

2. The optical pickup as set forth in claim 1, wherein the polarization rotating element is a liquid crystal element with a liquid crystal layer for generating a phase difference in the laser beam in response to applied electric field in the low-power operation mode.

3. The optical pickup as set forth in claim 1, wherein the attenuating means is a reflecting element for reflecting part of incident light from the laser source, or an absorbing element for absorbing part of incident light from the laser source.

4. The optical pickup as set forth in claim 3, wherein the reflecting element or the absorbing element is a liquid crystal element with a liquid crystal layer that serves as the reflecting element or the absorbing element in response to applied electric field in the low-power operation mode.

5. The optical pickup as set forth in claim 1, wherein the attenuating means includes at least a liquid crystal element with a liquid crystal layer, and the liquid crystal element serves to attenuate the incident laser beam on the optical disk in response to applied electric field to the liquid crystal layer in the low-power operation mode.

6. An optical disk reproducing device for reproducing information from an optical disk by projecting a laser beam on the optical disk, comprising:

an optical pickup operable to reproduce information in a low-power operation mode in which a single-layer disk is reproduced or a disk is reproduced at a normal speed and a high-power operation mode in which a bi-layer disk is reproduced or a disk is reproduced at a double speed by switching the two operation modes, the optical pickup including attenuating means for attenuating, only in the low-power operation mode, a laser beam emitted by a laser source onto the optical disk, wherein the attenuating means includes a polarization beam splitter disposed in an optical path between the laser source and the optical disk, and a polarization rotating element disposed between the laser source and the polarization beam splitter, and a transmittance of a P polarized component of the laser beam passing through the polarization beam splitter in the low-power operation mode is 20% to 50% of that in the high-power operation mode.

7. The optical disk reproducing device as set forth in claim 6, wherein:

the optical disk reproducing device is operable to reproduce information from a single-layer disk and a bi-layer disk; and the optical pickup is operated in the low-power operation mode when reproducing information from the single-layer disk, and the optical pickup is operated in the high-power operation mode when reproducing information from the bi-layer disk.

8. The optical disk reproducing device as set forth in claim 6, wherein:

the optical disk reproducing device is operable to reproduce information at a normal speed and at a double or faster speed; and the optical pickup is operated in the low-power operation mode when reproducing information at a normal speed, and the optical pickup is operated in the high-power operation mode when information is reproduced at a double or faster speed.

9. The optical disk reproducing device as set forth in claim 7, wherein:

the optical disk reproducing device is operable to record information in the optical disk; and the optical pickup is operated in the high-power operation mode when recording information.

10. The optical disk reproducing device as set forth in claim 8, wherein:

the optical disk reproducing device is operable to record information in the optical disk; and the optical pickup is operated in the high-power operation mode when recording information.

11. The optical disk reproducing device as set forth in claim 6, wherein the polarization rotating element includes:

a liquid crystal element with a liquid crystal layer, disposed between the laser source and the polarization beam splitter, for generating a phase difference in the laser beam in response to applied electric field in the low-power operation mode.

12. The optical disk reproducing device as set forth in claim 11, further comprising:

monitor means for detecting a quantity of the laser beam; and laser source power control means for controlling output of the laser source based on a result of detection by the monitor means, wherein the laser source power control means switches control operations between the low-power operation mode and the high-power operation mode.

* * * * *

UNITED STATES PATENT AND TRADEMARK OFFICE
CERTIFICATE OF CORRECTION

PATENT NO. : 7,298,686 B2
APPLICATION NO. : 10/737103
DATED : November 20, 2007
INVENTOR(S) : Takahiro Miyake It is certified that error appears in the above-identified patent and that said Letters Patent is hereby corrected as shown below:

On the Title page, item (75); the inventor's name is corrected to --Takahiro Miyake.--

Signed and Sealed this

Third Day of June, 2008

JON W. DUDAS
*Director of the United States Patent and Trademark Office*